United States Patent Office 3,116,234
Patented Dec. 31, 1963

3,116,234
PROCESS FOR THE CATALYTIC DESULFURIZATION OF HYDROCARBON OILS
Cornelis T. Douwes, Pieter A. van Weeren, and Hendrikus de Ruiter, all of Amsterdam, Netherlands, assignors to Shell Oil Company, New York, N.Y., a corporation of Delaware
No Drawing. Filed Feb. 23, 1961, Ser. No. 90,941
7 Claims. (Cl. 208—208)

This invention relates to a process for the catalytic desulfurization of hydrocarbon oils containing cyclic and/or acyclic sulfur compounds.

It is known to desulfurize hydrocarbon oils by contacting these oils with a catalyst in the presence of hydrogen at elevated temperature and pressure. The drawback of this hydrosulfurization is that it requires hydrogen. It is also known to catalytically desulfurize hydrocarbon oils containing cyclic and acyclic sulfur compounds without using free hydrogen. Thus, U.S. Patent 2,151,721 describes a two-stage process for the desulfurizing of hydrocarbon fractions in which non-heterocyclic sulfur compounds, for example aliphatic and aromatic mercaptans, are decomposed in the first stage by means of a catalyst of the clay type such as bauxite and fuller's earth or of the metal oxide type, whereas in the second stage the heterocyclic sulfur compounds, for example thiophenes, are decomposed by means of a catalyst of the metal, metal oxide or metal sulfide type.

However, it has been found that with the use of this latter process only a small percentage of the heterocyclic sulfur compounds are decomposed, so that in the case of products having a high content of such sulfur compounds the desulfurization is inadequate.

It is an object of this invention to provide an improved desulfurization process. It is another object of the invention to provide a desulfurization process not involving injection of free hydrogen. A further object is the provision of a process causing the removal of a substantial proportion of heterocyclic sulfur compounds. Other objects will become apparent during the following description of the invention.

Now, in accordance with this invention, a process for the catalytic desulfurization of hydrocarbon oils containing cyclic and/or acyclic sulfur compounds has been found which comprises contacting these hydrocarbon oils at an elevated temperature with a catalyst containing at least one sulfide of an element of the left-hand column of group VI of the periodic table and at least one sulfide of the group of metals consisting of iron, nickel and cobalt, which process is characterized in that the hydrocarbon oil is passed over the catalyst at a temperature in the range of 350° C. to 450° C. and a pressure of at least 15 atm. abs., in the presence of steam, the said catalyst being supported on a carrier consisting wholly or partly of alumina. The presence of steam has been found to materially improve conversion and removal of heterocyclic sulfur compounds.

The process according to the invention is preferably carried out at temperatures ranging from 375° C. to 425° C. The pressure applied should be at least 15 atm. abs. and is usually between 20 and 100 atm. abs., pressures in the range of from 30 to 75 atm. being preferred.

The composition of the catalyst used is also important. The catalyst should contain at least one sulfide of an element of the lefthand column of group VI of the periodic table (chromium, molybdenum, tungsten) and at least one sulfide of the group of metals consisting of iron, nickel and cobalt. Cobalt sulfide and molybdenum sulfide are preferred.

It has been found that the catalytically active metal components should be supported on a carrier wholly or partially consisting of alumina. The alumina content of the carrier may vary within wide limits. The carrier may, for example, contain between 5 to 95% by weight of alumina. Carriers having a high alumina content, for example 90% by weight or more, are preferred.

Natural or synthetic alumina-containing materials may be used as carriers. These materials may, for example, also contain silica.

The catalysts used are prepared in the usual ways. To this end the carrier material may, for example, be impregnated with a solution of salts of the catalytically active metals. After drying these salts are converted by calcination into the corresponding metal oxides which are subsequently converted into metal sulfides in a manner known per se, for example with a mixture of hydrogen and hydrogen sulfide or with carbon disulfide, butyl mercaptan, etc.

The liquid hourly space velocity employed may vary within wide limits, but a liquid hourly space velocity in the range of from 0.25 to 4 kg. oil per liter of catalyst per hour is preferably used.

The ratio of the molar amounts of steam and hydrocarbon is determined, inter alia, by the sulfur content of the oil. 5 to 50 mols of steam are generally employed per gram atom of sulfur in the feed.

The process according to the invention is suitable for the desulfurization of hydrocarbon oils such as gasolines, kerosenes, gas oils, lubricating oils and residual oils which may contain sulfur compounds of widely divergent composition. Both the acyclic sulfur compounds such as mercaptans, sulfides and disulfides, which are usually more readily affected, and also the more stable cyclic sulfur compounds such as thiophene and its derivatives are composed in the process according to the invention.

In addition to the above advantages of the process according to the invention the great selectivity of the desulfurization merits special mention. By this is meant that of the feedstock to be desulfurized practically only the sulfur-containing molecules are affected, the hydrocarbon molecules remaining intact, viz. starting from a mixture of, for example, benzene and thiophene, practically only thiophene, is decomposed with the use of the process of the present invention.

The desulfurization reaction may be carried out in the vapor phase, the liquid phase or partly in the vapor phase and partly in the liquid phase, depending on the feedstock to be desulfurized and the operating conditions. It is usually preferable to use the trickle phase technique.

The process according to the invention is illustrated by the following examples.

*Example I*

In order to demonstrate the need for steam in the process according to the invention the two following experiments were carried out:

Benzene contaminated with about 10% by volume of thiophene, the mixture having a sulfur content of 4.5% by weight, was passed, without the addition of steam, at a pressure of 20 atm. abs., a temperature of 400° C. and a liquid hourly space velocity of 0.25 liter (at room temperature) of liquid feedstock per liter of catalyst per hour, over a cobalt sulfide-molybdenum sulfide-alumina catalyst (3 x 3 mm. pellets). The catalyst had the following composition (calculated as oxides): 4.4 parts by weight of CoO, 11.2 parts by weight of $MoO_3$, and 100 parts by weight of $Al_2O_3$ (with about 1% by weight of $SiO_2$).

A second experiment was carried out in an identical manner with the same feedstock, but this time in the presence of steam. The steam feedstock ratio was 1 kg. of steam per liter (at room temperature) of liquid feedstock corresponding to 50 mols of steam per gram atom of sulfur. In the absence of steam the sulfur content of the final product was found to be 4.18% by weight, corresponding to a desulfurization of only 1%, whereas the final product obtained in the second experiment had a sulfur content of 0.48% by weight, corresponding to a desulfurization of over 90%.

*Example II*

Benzene contaminated with about 10% by volume of thiophene, the mixture having a sulfur content of 4.5% by weight, was passed at a pressure of 20 atm. abs., a temperature of 400° C. and a liquid hourly space velocity of 0.25 liter (at room temperature) of liquid feedstock per liter of catalyst per hour, in the presence of steam, over a cobalt oxide-molybdenum oxide catalyst (3 x 3 mm. pellets). The steam feedstock ratio was 1 kg. of steam per liter of feedstock, corresponding to 50 mols of steam per gram atom of sulfur. The composition of the catalyst was 3.8% by weight of CoO, 9.9% by weight of $MoO_3$, 1.0% by weight of $SiO_2$ and 85.3% by weight of $Al_2O_3$.

Under the same conditions, the same feedstock was passed over a completely sulfurized cobalt-molybdenum catalyst which, calculated as oxides, had the same composition as the oxide catalyst.

Using the oxidic catalyst a final product was obtained having a sulfur content of 4.3% by weight. Hence only about 3.5% of the feedstock had been desulfurized. On the other hand, with the sulfidic catalyst a final product was obtained having a sulfur content of 0.40% by weight, corresponding to a desulfurization of over 90%.

The above shows that the catalyst should contain the active metals in the form of their sulfides.

*Example III*

Technical xylene contaminated with about 10% by volume of thiophene, which mixture had a sulfur content of 4.5% by weight, was passed at a pressure of 20 atm. abs., a temperature of 400° C. and a space velocity of 0.5 liter (at room temperature) of liquid feedstock per liter of catalyst per hour, in the presence of steam, over a cobalt sulfide-molybdenum sulfide-alumina catalyst (3 x 3 mm. pellets) (catalyst I). The steam feedstock ratio was 0.2 kg. of steam per liter of feedstock, corresponding to 10 mols of steam per gram atom of sulfur.

Under the same conditions as described above the same base material was passed over a cobalt sulfide-nickel sulfide-molybdenum sulfide-alumina catalyst (3 x 3 mm. pellets) (catalyst II). The following table shows the compositions of the two catalysts (calculated as the corresponding oxides) as well as the sulfur content of the final product and the percentage of desulfurization.

|  | Catalyst I | Catalyst II |
|---|---|---|
| CoO, parts by weight | 4.4 | 4.4 |
| NiO, parts by weight |  | 2.2 |
| $MoO_3$, parts by weight | 11.2 | 11.2 |
| $Al_2O_3$, parts by weight | 100 | 100 |
| Weight percent S in final product | 0.75 | 1.30 |
| Percent desulfurization | 80.3 | 70.1 |

This table shows that good desulfurization was also obtained with cobalt sulfide-nickel sulfide-molybdenum sulfide-alumina catalyst. In this case, however, a better desulfurization was obtained with the cobalt sulfide-molybdenum sulfide-alumina catalyst.

*Example IV*

In order to demonstrate the effect of the carrier material on the desulfurization, technical xylene contaminated with 10% by volume of thiophene (4.5% by weight of sulfur in the mixture) was passed together with steam, under the same conditions as employed in Example III, over a catalyst consisting of cobalt sulfide-molybdenum sulfide-alumina-silica, and a similar experiment was conducted with a cobalt sulfide-molybdenum sulfide-silica catalyst containing no alumina. In both cases the catalysts calculated as oxides, contained 4.4 parts by weight of CoO and 11.2 parts by weight of $MoO_3$ supported on 100 parts by weight of carrier. In the first case the carrier contained 97% by weight of $Al_2O_3$ and 3% by weight of $SiO_2$, and in the second case it consisted of 100% of $SiO_2$.

When the desulfurization was effected with the catalyst containing $Al_2O_3$ the final product contained 0.75% by weight of S (corresponding to a desulfurization of 80.3%), whereas with a cobalt sulfide-molybdenum sulfide-silica catalyst a final product was obtained having 4.32% by weight of S, corresponding to a desulfurization of only 4%. This shows that the presence of $Al_2O_3$ in the carrier is essential to good desulfurization.

*Example V*

A number of desulfurization experiments demonstrate the suitability of the process according to the invention for the removal of sulfur present in cyclic as well as acyclic compounds.

Some sulfur-containing mixtures of which the composition is given in the following table, were passed, in the presence of steam, at pressure of 20 atm. abs., a temperature of 400° C., a liquid hourly space velocity of 0.25 liter per liter of catalyst per hour and a steam feedstock ratio of 1 kg. steam per liter (at room temperature) of liquid feedstock, over a sulfidic catalyst (3 x 3 mm. pellets), which, converted into oxides, had the following composition: 4.4 parts by weight of CoO, 11.2 parts by weight of $MoO_3$, 100 parts by weight of $Al_2O_3$ (with about 1% by weight of $SiO_2$).

The percentage sulfur in the starting material, the percentage sulfur in the end product and the percentage desulfurization are given in the following table.

| Starting Material | Weight Percent Sulfur | | Desulfurization. Percent |
|---|---|---|---|
|  | In feedstock | In end product |  |
| Benzene+thiophene | 4.5 | 0.36 | 92.0 |
| Toluene+thiophene | 4.6 | 0.34 | 92.6 |
| Xylene+thiophene | 4.6 | 0.51 | 88.9 |
| N. decane+thiophene | 5.3 | 0.50 | 90.5 |
| N. decane+thiophenol | 5.3 | 0.29 | 94.5 |
| N. decane+butyl mercaptan | 5.3 | 0.10 | 98.1 |

*Example VI*

The effect of temperature and pressure on the desulfurization was ascertained by a series of twelve experiments.

In all tests technical xylene contaminated with about 10% by vol. of thiophene (corresponding to 4.5% by weight of sulfur in the mixture) was passed, in the presence of steam, over a cobalt sulfide-molybdenum sulfide-alumina catalyst at a liquid hourly space velocity of 0.50 liter (liquid) of starting material per liter of catalyst per hour and a steam feedstock ratio of 0.2 kg. steam per liter of feedstock.

Calculated as oxides, the catalyst contained 4.4 parts by weight of CoO and 11.2 parts by weight of $MoO_3$ supported on 100 parts by weight of carrier. The carrier contained 97% by weight of $Al_2O_3$ and 3% weight of $SiO_2$.

The following table shows the temperatures and pressures applied in the tests as well as the sulfur content of the final products obtained and the percentage desulfurization.

| Experiment No. | Pressure, atm. abs. | Temperature, °C | Sulfur content percent of the final product, percent by weight | Desulfurization |
|---|---|---|---|---|
| 1 | 20 | 375 | 2.45 | 45.6 |
| 2 | 20 | 400 | 1.44 | 68.0 |
| 3 | 20 | 425 | 1.97 | 56.2 |
| 4 | 20 | 375 | 2.45 | 45.6 |
| 5 | 30 | 375 | 1.73 | 61.6 |
| 6 | 40 | 375 | 1.59 | 64.7 |
| 7 | 1 | 400 | 4.25 | 5.6 |
| 8 | 10 | 400 | 2.69 | 40.2 |
| 9 | 15 | 400 | 2.27 | 49.6 |
| 10 | 20 | 400 | 1.44 | 68.0 |
| 11 | 30 | 400 | 0.83 | 81.6 |
| 12 | 40 | 400 | 0.87 | 80.7 |

The results of experiments 1–3 show that desulfurization at a pressure of 20 atm. abs. is improved by increasing the temperature from 375° to 400° C. A further increase to 425° C. causes the desulfurization to decline again.

Experiments 4–12 show that at a given temperature desulfurization increases when the pressure is increased.

*Example VII*

The good selectivity which is a characteristic feature of the process according to the invention was shown by the following experiments using pure compounds.

In three experiments substantially sulfur-free benzene, toluene and xylene respectively were passed, in the presence of steam, over a cobalt sulfide-molybdenum sulfide-alumina catalyst (3 x 3 mm. pellets) (same composition as that of the catalyst referred to in Example VI) at a pressure of 20 atm. abs., a temperature of 400° C., a liquid hourly space velocity of 0.25 liter (at room temperature) of liquid feedstock per liter of catalyst per hour and a steam feedstock ratio of 1 kg. of steam per liter of feedstock.

The same experiments were repeated under the same conditions, except that 10% by vol. of thiophene was also added to each of the feedstocks benzene, toluene and xylene.

In addition to the sulfur content of the final products obtained the quantities of carbon dioxide possibly formed were also determined in the gas leaving the reactor since the amount of carbon dioxide formed is a measure of the selectivity of the process. If sulfur-free hydrocarbon molecules are converted by steam, this results in the formation of other hydrocarbon molecules, carbon dioxide and hydrogen, whereas these reaction products and in addition hydrogen sulfide are likewise formed from sulfur-containing hydrocarbon molecules.

The following table summarizes the results:

| Feedstock | Percent by weight of S in feedstock | Percent by weight of S in final product | Percent desulfurization | Amount of $CO_2$ liters (N.T.P.)/kg. feedstock |
|---|---|---|---|---|
| Benzene | trace | trace | -------- | trace |
| Toluene | trace | trace | -------- | trace |
| Xylene | trace | trace | -------- | trace |
| Benzene+thiophene | 4.5 | 0.36 | 92.0 | 34 |
| Toluene+thiophene | 4.6 | 0.34 | 92.6 | 35 |
| Xylene+thiophene | 4.6 | 0.51 | 88.9 | 29 |

The above results show that, under the conditions applied, only the thiophene reacted with steam, whereas the hydrocarbon molecules were not converted.

We claim as our invention:

1. A process for the catalytic desulfurization of a hydrocarbon oil containing organic sulfur compounds which comprises contacting said hydrocarbon oil with steam as the sole desulfurizing gas at a temperature in the range of from about 350° C. to 450° C. and a pressure of at least 15 atmospheres absolute in the presence of a catalyst containing at least one sulfide of an element of the left hand column of group VI of the period table and at least one sulfide of the group of metals consisting of iron, nickel and cobalt, said sulfide being supported on a carrier comprising of alumina.

2. A process as claimed in claim 1, wherein the desulfurization takes place at a temperature in the range of from 375° C. to 425° C.

3. A process as claimed in claim 1 wherein the desulfurization takes place at a pressure in the range of from 20 to 100 atm. abs.

4. A process as claimed in claim 1 wherein the catalyst contains cobalt sulfide and molybdenum sulfide.

5. A process as claimed in claim 1 wherein the catalyst carrier contains at least 90% by weight of alumina.

6. A process as claimed in claim 1 wherein the liquid hourly space velocity used is in the range of from 0.25 to 4 kg. oil per liter of catalyst per hour.

7. A process as claimed in claim 1 wherein the steam/hydrocarbon oil ratio used is such that the number of mols of steam per gram atom of sulfur is in the range of from 5 to 50.

References Cited in the file of this patent

UNITED STATES PATENTS

| 2,642,381 | Dickinson | June 16, 1953 |
| 2,901,423 | Herbert et al. | Aug. 25, 1959 |
| 2,959,627 | Fleming et al. | Nov. 8, 1960 |